United States Patent [19]

Koshi et al.

[11] Patent Number: 4,779,982
[45] Date of Patent: Oct. 25, 1988

[54] SPECTROFLUOROPHOTOMETER WITH MONITOR DETECTOR FOR LIGHT SOURCE

[75] Inventors: Hiroyuki Koshi, Katsuta; Shunichi Matuura, Toukai; Minoru Owada, Katsuta; Hiroshi Hirose, Ibaraki; Tadao Ishii, Katsuta, all of Japan

[73] Assignee: Hitachi, Ltd., Tokyo, Japan

[21] Appl. No.: 796,808

[22] Filed: Nov. 12, 1985

[30] Foreign Application Priority Data

Nov. 12, 1984 [JP] Japan .................... 59-238987

[51] Int. Cl.⁴ ............................................ G01N 21/64
[52] U.S. Cl. ................................. 356/318; 250/458.1
[58] Field of Search ................... 356/317, 318, 334; 250/458.1, 459.1, 461.1, 461.2

[56] References Cited

U.S. PATENT DOCUMENTS

| | | | |
|---|---|---|---|
| 3,832,555 | 8/1974 | Ohnishi | 250/458.1 |
| 4,022,529 | 5/1977 | White | 356/318 |
| 4,198,567 | 4/1980 | Eneroth et al. | 250/459 |
| 4,203,670 | 5/1980 | Bromberg | 356/365 |
| 4,575,242 | 3/1986 | Akiyama et al. | 356/334 X |
| 4,618,260 | 10/1986 | Okubo | 356/334 X |
| 4,622,468 | 11/1986 | Stefanski et al. | 356/317 X |
| 4,647,199 | 3/1987 | Ferber et al. | 356/318 X |

Primary Examiner—Vincent P. McGraw
Attorney, Agent, or Firm—Antonelli, Terry & Wands

[57] ABSTRACT

A spectrofluorophotometer enabling spectrum correcting treatment to be done highly accurately, including an intercepter the incident light in a fluorescence detecting system, and an interceptor intercepting the incident light in a monitoring detecting system, so as to carry out zero point correction for both of these detecting systems.

6 Claims, 3 Drawing Sheets

—————— I WHEN SLIT WIDTH IS FIXED
- - - - - - I WHEN SLIT WIDTH IS NARROW
—·——·—— I WHEN SLIT WIDTH IS WIDE

SPECTROFLUOROPHOTOMETER WITH MONITOR DETECTOR FOR LIGHT SOURCE

BACKGROUND OF THE INVENTION

This invention relates to a spectrofluorophotometer having data processing functions, and more particularly to a spectrofluorophotometer suitably used for the measurement of a spectrum which requires a correcting treatment.

When the excitation or fluoroscence spectrum of a sample is determined by using a flurophotometer, the wavelength characteristics of the photometer including a light source, a spectroscope and a detector are superposed on a spectrum peculiar to the sample. Therefore, in order to obtain a spectrum peculiar to a sample, it is necessary to eliminate the effect of the wavelength characteristics of the photometer. To meet such a requirement, a beam of light from a light source is split by a beam splitter to obtain a ratio of the fluorometric intensities measured with a monitor detecting system and a fluoroscence detecting system and thereby eliminate the influence of the wavelength characteristics of a light source as shown in U.S. Pat. No. 4,198,567.

In order to eliminate the influences of the wavelengths of a spectroscope and a detector, a sample, the wavelength characteristics of which are known, is subjected to measurement in advance to determine the wavelength characteristics of the spectroscope and detector, and the spectrum correction is done after a sample, the wavelength characteristics of which are unknown, has been subjected to measurement, to obtain a spectrum peculiar to the latter sample.

The wavelength characteristics of a spectroscope vary depending upon slit width. Accordingly, the spectrum correction during the determination of the wavelength characteristics of a spectroscope and the spectrum correction during the measurement of a sample are carried out with the slit width set to a uniform level.

As a spectrum correcting treatment has been done widely in recent years, the development of the techniques for enabling such a treatment to be done with a high accuracy even when the slit width varies has strongly been demanded.

SUMMARY OF THE INVENTION

An object of the present invention is to provide a spectrofluorophotometer capable of correcting the wavelength characteristics of a photometer with a high accuracy even when the slit width is varied, and determining the spectrum, which is peculiar to a sample, with a high accuracy.

With a view to achieving this object, a spectrum correcting treatment was discussed to discover the following. In a conventional spectrum correcting treatment, a ratio computation treatment is effected for the purpose of eliminating the wavelength characteristics of a light source, and a deviation of the zero point in a fluorescence detecting system is measured for the purpose of adjusting the zero point in a photometer, to thereby carry out the spectrum correction. However, a deviation of the zero point in a monitor detecting system, which does not have direct effect upon a measurement value, is not taken into consideration. This constitutes the main cause of the trouble that, when the slit width is varied, a high spectrum correcting accuracy cannot be obtained.

Therefore, according to the present invention, a means for intercepting the incident light into a fluorescent detecting system, and a means for intercepting the incident light into a monitor detecting system are provided so as to carry out the correction of zero points in these systems.

DESCRIPTION OF THE PREFERRED EMBODIMENT

Figure 1:
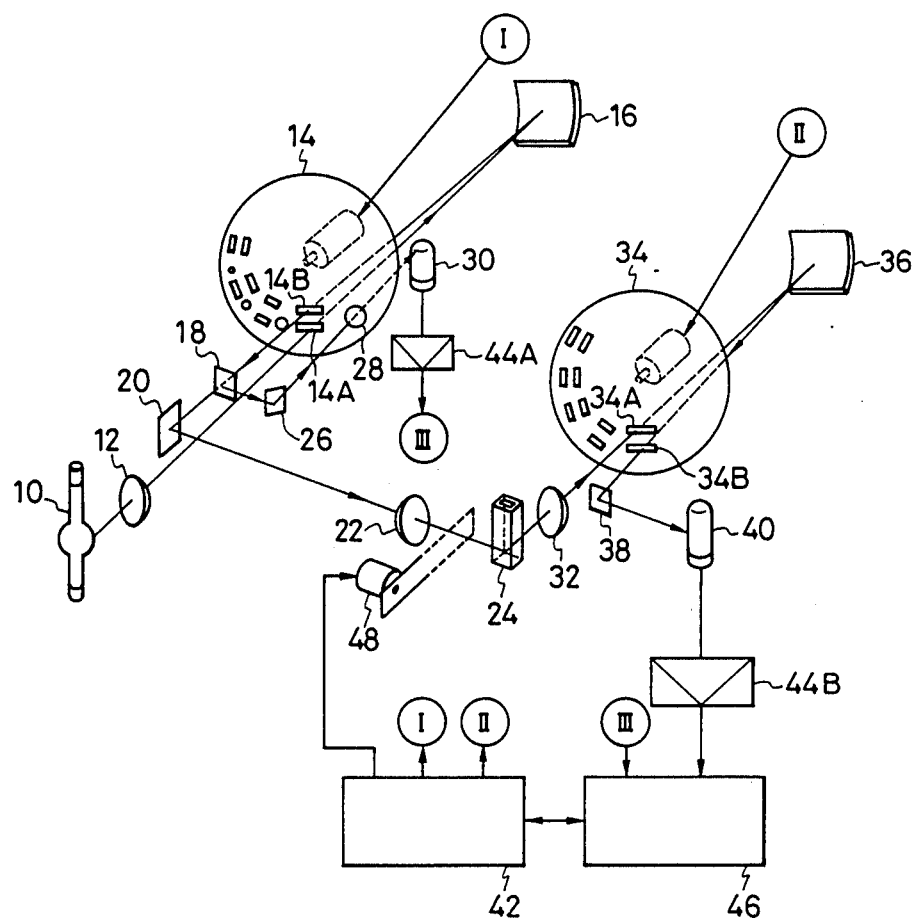
FIG. 1 is a construction diagram of the spectrofluorophotometer as a whole according to the present invention.

Referring to FIG. 1, a beam of light emitted from a xenon lamp 10 is condensed by a lens 12, and passes through an inlet slit 14A in an excitation slit member 14 to be spectralized by an excitation spectroscope 16. The spectralized excitation light is applied to a sample cell 24 through an outlet slit 14B in the excitation slit member 14, a mirror 20 and a lens 22. A part of the excitation light is split by a beam splitter 18, and passes via a mirror 26 and through a monitoring window 28, which is provided in the excitation slit member, to be subjected to the measurement of its quantity of light with a monitoring detector 30. The fluorescence generated in the sample cell 24 is condensed by a lens 32, and passes through an inlet slit 34A in a fluorescence slit member 34 to be spectralized by a fluorescence spectroscope 36. The spectralized fluorescence passes through an outlet slit 34B in the fluorescence slit member 34 and a mirror 38 to be subjected to the measurement of the intensity thereof with a fluorescence detector 40. The slit members 14, 34 and a shutter 48 are controlled by a control system 42. A monitoring signal $I_M$ and a fluorescence signal $I_S$ of the excitation light are sent to a computing element 46 through amplifiers 44A, 44B, respectively, and a measurement value I is computed therein.

Each of the excitation slit member 14 and fluorescence slit member 34 consists of a rotatable disc, and these slit members are provided with a plurality of inlet slits 14A, 34A and a plurality of outlet slits 14B, 34B. The excitation slit member 14 is further provided with a plurality of monitoring windows in addition to the inlet and outlet slits 14A, 14B.

Figure 2:
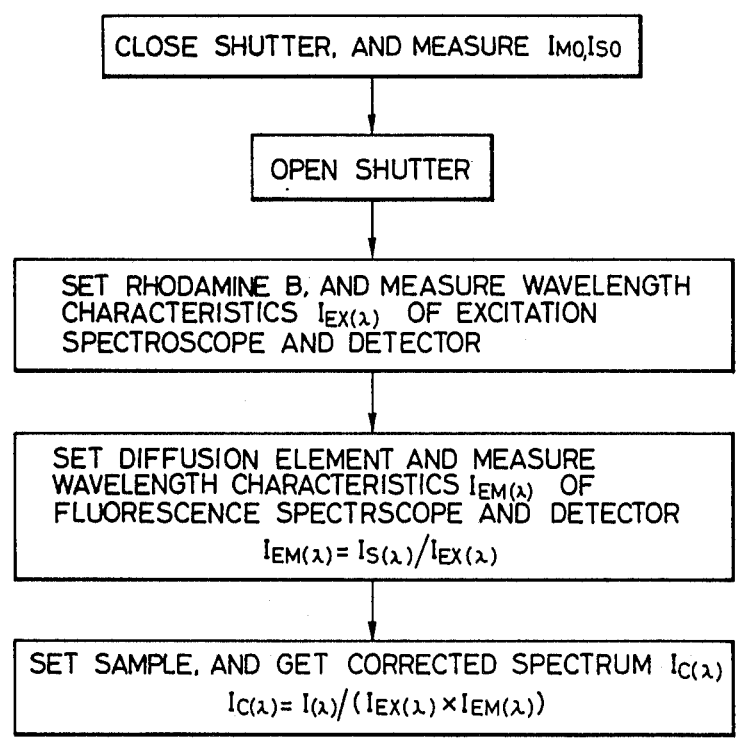
FIG. 2 is a flow chart showing the measuring procedure of a spectrum correcting operation.

FIG. 2 shows the procedure of measurement including a spectrum correcting operation. First, in order to measure the deviations $I_{MO}$, $I_{SO}$ of the zero point in a detecting system, the shutter 48 is closed, and the excitation slit member 14 is turned to the position in which the light from the xenon lamp 10 does not enter the monitoring detector 30. During this time, the measurement values obtained at the monitoring detector 30 and fluorescence detector 40 are stored as $I_{MO}$, $I_{SO}$, respectively, in the computing element 46. The shutter 48 is then opened to return the excitation slit member 14 to its original position shown in FIG. 1. In the range of wavelength of 200–600 nm, a sample cell containing rhodamine B, which emits fluorescence, the intensity of which is proportional to that of the excitation light, is set in a proper place, and the fluorescence wavelength is regulated to the level of that of the rhodamine B. When the excitation wavelength is subjected to scanning, a spectrum representative of the wavelength characteristics $I_{EX(\lambda)}$ of the excitation spectroscope and detector are obtained. The wavelength characteristics $I_{EX(\lambda)}$ are memorized, $I_{EX(\lambda)}$ representing the characteristic value at the wavelength λ. A diffusion element which is adapted to guide a predetermined portion of the excitation ligth into the fluorescence spectroscope irrespective of the wavelength, is then set in the sample cell, and the excitation and fluorescence wavelengths are scanned at once. On the basis of the spectrum $I_{S(\lambda)}$ thus obtained and the previously-determined excitation wavelength $I_{EX(\lambda)}$, the wavelength characteristics $I_{EM(\lambda)}$ of the fluorescence spectroscope and detector can be determined in accordance with the equation, $I_{EM(\lambda)} = I_{S(\lambda)}/I_{EX(\lambda)}$. This $I_{EM(\lambda)}$ is also memorized. A sample to be measured is then set in the sample cell to measure the intensity $I_{(\lambda)}$. Consequently, the corrected spectrum $I_{C(\lambda)}$ peculiar to the sample can be determined in accordance with the equation, $$I_{C(\lambda)} = I_{S(\lambda)}/(I_{EX(\lambda)} \times I_{EM(\lambda)})$$

wherein $I_{(\lambda)}$ is a ratio of the monitoring signal $I_{M(\lambda)}$ to the fluorescence signal $I_{S(\lambda)}$. Therefore, $I_{C(\lambda)}$ can be expressed by the equation, $$I_{C(\lambda)} = I_{S(\lambda)}/I_{M(\lambda)} \times (I_{EX(\lambda)} \times I_{EM(\lambda)})$$

According to the present invention, both the deviation $I_{SO}$ of the zero point in the fluorescence detecting system and the deviation $I_{MO}$ of the zero point in the monitor detecting system are corrected. Therefore, a corrected spectrum can be determined in accordance with the above equation. However, in a conventional spectrofluorophotometer, in which the measurement of the zero point deviation $I_{MO}$ in the monitoring detecting system is not made, $I_{C(\lambda)}$ is determined in accordance with the equation, $$I_{C(\lambda)} = I_{S(\lambda)}/(I_{M(\lambda)} + I_{MO}) \times (I_{EX(\lambda)} \times I_{EM(\lambda)})$$

Figure 3A:
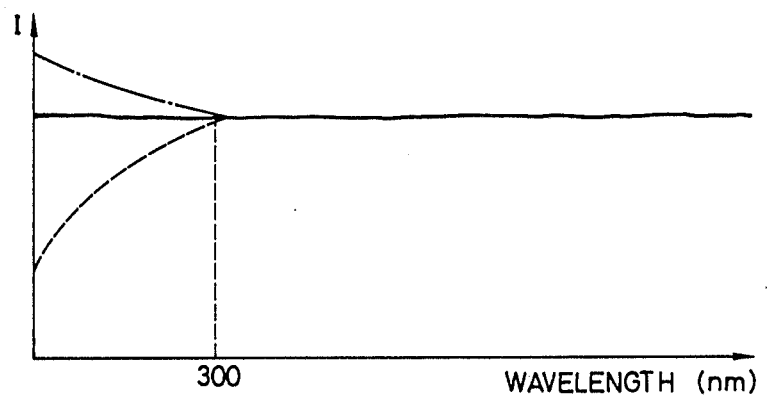
FIGS. 3(A) and 3(B) are diagrams showing the comparative data obtained by a prior art spectrofluorophotometer and the spectrofluorophotometer according to the present invention.
Figure 3B:
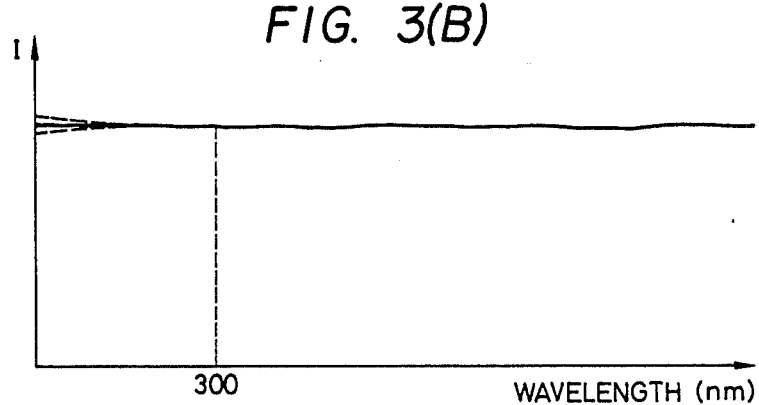

Accordingly, when the intensity of the monitoring light is too low to ignore $I_{MO}$, more specifically, in a fluorophotometer using a xenon lamp as a light source, the wavelength characteristics, which are determined by ratio computation, of the light source cannot be eliminated accurately in the range of wavelength of not more than 300 nm due to the influence of $I_{MO}$. When the slit width of the spectroscope is equal during the measurement of the wavelength characteristics $I_{EX(\lambda)}$, $I_{EM(\lambda)}$ of the photometer and during the measurement of a sample, the influence of $I_{MO}$ is included in $I_{EX(\lambda)}$, $I_{EM(\lambda)}$ and poses no problems. However, when slit width varies, the correction accuracy decreases due to the effect of $I_{MO}$. According to the present invention, the correction of $I_{MO}$ is also done, so that, even when the slit width of the spectroscope varies, the correction accuracy does not substantially vary even in the range of wavelength of not more than 300 nm. FIGS. 3(A) shows the correction accuracies of a conventional fluorophotometer and FIG. 3(B) shows the correction accuracies for the fluorophotometer according to the present invention (B), which correction accuracies are determined with the slit width varied. The figures show that the correction accuracy increases in inverse proportion to the quantity of variations in the slit width. According to the present invention, in which $I_{MO}$ is measured with the incident light into the monitoring detector intercepted, no shutters are additionally provided for conducting this measurement; a slit mechanism which is indispensable to a sepctroscope is utilized. Therefore, although the correction accuracy of this photometer is improved to a great extent, the construction thereof is identical with that of a prior art photometer. When the level of a monitoring signal $I_{M(\lambda)}$ has become substantially zero during the correction of $I_{MO}$, even a minute variation of the signal has a great influence upon a measurement value. Hence, the monitoring signal introducing window in formed so that it becomes larger when the slit width is reduced, so as to prevent the monitoring signal $I_{M(\lambda)}$ from becoming extremely small. In the above-described embodiment, a shutter 48 is used to intercept the incident light in the fluorescence detecting system. Even when the intercepting of such incident light is done by rotating the fluorescence slit member 34, the same effect can be obtained. Since the shutter 48 has a higher responding capability than a shutter utilizing a slit member, it can be effectively used to, for example, measure the rate of attenuation of fluorescence while momentarily intercepting the excitation light advancing to a sample. When a shutter is provided between the xenon lamp 10 and excitation slit member 14 to intercept the incident light to the monitoring detecting system and fluorescence system at once, the same effect can also be obtained.

According to the present invention, the wavelength characteristics of the light source can be removed from a spectrum obtained by a fluorophotometer irrespective of the quantity of light (intensity of excitation light) from the light source. This enables the improvement of the spectrum correcting accuracy, the primary problem with fluorophotometers, and a simple measurement of a spectrum peculiar to a sample.

We claim:

1. A spectrofluorophotometer comprising a light source, an excitation spectroscope for spectralizing the light from said light source, an excitation slit member provided between said light source and said excitation spectroscope and having inlet slits, into which the light from said light source is introduced, and outlet slits, from which the light from said excitation spectroscope is discharged, a beam splitter for splitting the light from said excitation spectroscope, a monitoring detector for detecting one of the beams from said beam splitter, a sample to which the other beam from said beam splitter is applied, a fluorescence spectroscope for spectralizing the fluorescence from said sample, a fluorescence slit member provided between said sample and said fluorescence spectroscope and having inlet slits, into which the fluorescence from said sample is introduced and outlet slits, from which the light from said fluorescence spectroscope is discharged, a detector for detecting fluorescence from said fluorescence spectorscope, a computing element for processing signals from said monitoring detector and said fluorescence detector, and intercepting means provided at least between said light source and said excitation spectroscope for intercepting the light directed from said light source to said monitoring detector and to said fluorescence detector and for enabling at least measurement of deviation of a zero point for said monitoring detector, said monitoring detector supplying a signal indicative of the zero point deviation to said computing element, and said computing element enabling proper measurement by said spectrofluorophotometer in accordance with the zero point deviation of said monitoring detector.

2. A spectrofluorophotometer according to claim 1, wherein said excitation slit member consists of a rotatable disc, said excitation slit member being turned to intercept the light from said light source.

3. A spectrofluorophotometer according to claim 1, wherein said excitation slit member is provided with a monitoring window for applying the light from said beam splitter to said monitoring detector.

4. A spectrofluorophotometer according to claim 3, wherein said excitation slit member is provided with a plurality of pairs of inlet slits, outlet slits and monitoring windows.

5. A spectrofluorophotometer according to claim 1, wherein said intercepting means includes means provided between said beam splitter and said sample for intercepting the light directed from said excitation spectroscope to said sample.

6. A spectrofluorophotometer according to claim 1, wherein said fluorescence slit member consists of a rotatable disc, in which a plurality of pairs of inlet and outlet slits are provided.

* * * * *